United States Patent
Digirolamo et al.

(10) Patent No.: US 9,411,974 B2
(45) Date of Patent: Aug. 9, 2016

(54) MANAGING DOCUMENT REVISIONS

(71) Applicant: International Business Machines Corporation, Armonk, NY (US)

(72) Inventors: Lynn M. Digirolamo, Raleigh, NC (US); Judy J. Kogut-O'Connell, Hopewell Junction, NY (US); Thiago de Paula Tomarchio, Campinas (BR); Jacqueline A. Turner, Plano, TX (US); Danielle N. Wexler, Carlsbad, CA (US)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 14/094,829

(22) Filed: Dec. 3, 2013

(65) Prior Publication Data
US 2015/0154413 A1   Jun. 4, 2015

(51) Int. Cl.
G06F 7/04       (2006.01)
H04L 29/06      (2006.01)
G06F 7/00       (2006.01)
G06F 21/62      (2013.01)
G06F 17/30      (2006.01)

(52) U.S. Cl.
CPC ...... *G06F 21/6218* (2013.01); *G06F 17/30011* (2013.01); *G06F 17/30014* (2013.01); *G06F 17/30073* (2013.01)

(58) Field of Classification Search
CPC .............. H04L 63/107; G06F 21/6218; G06F 17/30011; G06F 17/30014; G06F 17/30073

USPC ......................................................... 726/26
See application file for complete search history.

(56) References Cited

U.S. PATENT DOCUMENTS

| | | | |
|---|---|---|---|
| 2003/0135607 A1* | 7/2003 | Bernard | G06F 17/30011 709/224 |
| 2011/0246869 A1 | 10/2011 | Vion-Dury | |
| 2013/0185252 A1* | 7/2013 | Palmucci | G06F 17/30011 707/608 |

FOREIGN PATENT DOCUMENTS

WO    WO2006054109    5/2006

OTHER PUBLICATIONS

Clemm et al.; RFC 3253—Versioning Extensions to WebDAV; 2002; Retrieved from the Internet <URL: tools.ietf.org/html/rfc3253>; pp. 1-120 as printed.*

Nixcraft; Apache restrict access based on IP address to selected directories; Apr. 2006; Retrieved from the Internet <URL: cyberciti.biz/faq/apache-restrict-access-based-on-ip-address-to-selected-directories/>; pp. 1-4 as printed.*

(Continued)

*Primary Examiner* — Aravind Moorthy
(74) *Attorney, Agent, or Firm* — Lieberman & Brandsdorfer, LLC

(57) ABSTRACT

Embodiments of the invention relates to tracking changes made to a document, and embedding the changes in the document while limiting access to the embedded changes. A log of the revisions is retained in a revision history, which is stored in an object library of alternative storage. Access to the document with acceptance of the changes is enabled. Markings associated with deletions and additions to the document, the revision history, or an alternative view showing the changes made is limited based upon a security protocol.

16 Claims, 4 Drawing Sheets

(56) References Cited

OTHER PUBLICATIONS

No stated author; Oracle—Expose your Internet Portal to the Outside World in a Secured Manner; 2012; Retrieved from the Internet <URL: web.archive.org/web/20120417181210/http://www.oracle.com/technetwork/middleware/ias/secured-inside-outside-130564.pdf>; pp. 1-18 as printed.*

MediaWiki; MediaWiki home-page and history-page; Jan. 2013; Retrieved from the Internet <URL: https://web.archive.org/web/20130103061131/http://www.mediawiki.org/wiki/MediaWiki>; pp. 1-7 as printed.*

* cited by examiner

MANAGING DOCUMENT REVISIONS

BACKGROUND

The present invention relates to enabling revisions to a document, and retaining a log of the revision details. More specifically, the invention relates to embedding the changes within the document, while placing a security protocol for limiting access to the changes.

Creation of a document often includes editing the document, and at times tracking the changes made to the document during the editing. With respect to the document being a template, editing the document includes documenting all changes on a separate document for reference, audit, and translation purposes. Changes are logged in detail in the separate document. Examples of the logged changes include, deletions, insertions, date changes, etc. Similarly, it is also know to track changes to a word processed document, with the tracking showing insertions, deletions, time of change, and author of the change. Accordingly, tools for managing document and document changes have been employed.

BRIEF SUMMARY

The invention comprises a method, computer program product, and system for managing document revisions and access to the associated revision history, and specifically, limiting access to the revision history through use of a security protocol.

A method, computer program product, and system are provided for enabling revisions to a document, embedding the revision in the document, and limiting access to document revisions. A revision history is created to document changes being made to the document. The revision history is stored in an object library separate from the document subject to revision. In addition, a link to the stored revision history is created and embedded within the document. Access to the revision history is limited, and specifically, activation of the link from within the document is managed, and the revision history is returned in response to approval of activation of the link.

Other features and advantages of this invention will become apparent from the following detailed description of the presently preferred embodiment(s) of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated.

DETAILED DESCRIPTION

Figure 1:
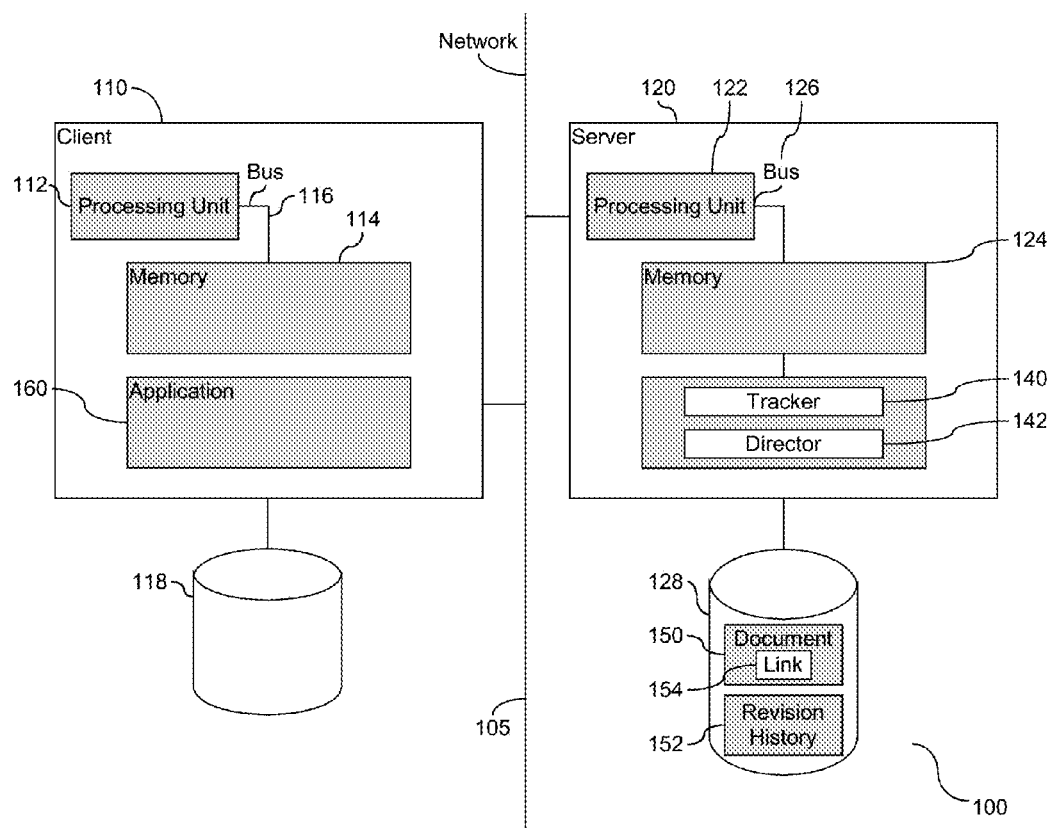
FIG. 1 depicts a block diagram illustrating tools embedded in a computer system to support template revision management.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Reference is made to revisions of a document and an associated revision history. Documents are commonly created with word processing software. A template is a document or file having a preset format, used as a starting point for a particular application. When the template is opening, it is the preset format that is presented. The preset format may include specific language, fields to be entered, etc. After data is entered in the template, the user is required to save a copy of the template as a new file so that the original format of the template is preserved. Accordingly, the template serves as a starting position for use of the document.

In business applications, such as proposals or contracts, specific paragraphs or clauses may be presented in the template. For example, a business entity may create a template for a contract for services offered. As the business entity evolves, one or more clauses in the contract may need to be modified, with the modifications present in a new form of the template. The function of the template enables multiple parties to access and use the same document. Specifically, it provides uniformity to the underlying business structure and ensures that for a specific category the same document template is used. Challenges arise with management of the template. For example, as the template is modified, it is important for the modifications to be reviewed and approved, or otherwise revised, prior to finalizing the modifications. At the same time, the changes may need to be translated. Showing the template changes with strikeout and underline markings may disturb any associated negotiations. By enabling the template to remain intact with the revisions maintained and marked in a separate document, and accessible from within the template, the functionality of the template remains undisturbed.

FIG. 1 is a block diagram (100) illustrating tools embedded in a computer system to support template revision management. As shown, a client machine (110) is provided in communication with a server (120). Although only one client machine (110) is shown, in one embodiment, multiple client machines may be in communication with the server (120) across a network connection (105). The client machine (110) is provided with a processing unit (112) operatively coupled to memory (114) across a bus (116). In one embodiment, the client machine is provided with local data storage (118). Similarly, the server (120) is provided with a processing unit (122) operatively coupled to memory (124) across a bus (126). In one embodiment, the server (120) is provided with local data storage (128). In one embodiment, data storage is provided in a remote data center (not shown) or a shared pool of resources (not shown) in communication with the server (120) across the network connection (105).

The server (120) is shown with tools in communication with the processing unit (122), the tools and processing unit (122) to manage document revisions. As shown, the tools include, but are not limited to, a tracker (140) and a director (142). To further illustrate the document revision management, a document (150) is provided. In one embodiment, the document is retained in data storage (128). An application (160) is shown local to the client machine (110) and functions to request access to the application (150). In one embodiment, the application is a word processing application. The application (160) requests and obtains access to the document (150). In one embodiment, the document (150) is provided in a template and any changes to the document are saved and associated with the template under a different document name. Similarly, in one embodiment, any changes to the document are saved with the document with the changes identified in an accompanying file. The tracker (140) tracks changes to the document (150), both in a template form and a non-template form. Specifically, the tracker (140) creates a revision history (152) documenting the tracked changes and stores the revision history (152) in data storage (128). In one embodiment, the revision history (152) is stored in the object library (not shown) within the data storage (128). Similarly, in one embodiment, the revision history (152) is stored in physical storage separate from the document (150). Accordingly, the revision history (152) is a separate element from the document (150) and functions to document and track changes, and at the same time is stored separate from the document (150).

The revision history (152) is a compilation of changes made in a document. In one embodiment, the revision history is a separately created and maintained document from the document (150). In one embodiment, each change noted in the revision history includes the date the change was entered and the actual revision that was made to the document. Similarly, in one embodiment, the changes to document (150) are not visible with the document; the visibility is limited to the revision history document (150). Accordingly, the revision history (152) enables the document (150) to remain undisturbed, i.e. free of markings, so that it may be shared with other parties who may not be privy to document changes.

To facilitate and enable access to the revision history (152), a link (154) to the stored revision history (152) is created and embedded in in the document (150). Access to the revision history (152) is enabled from within the document by activation of the link (154). In one embodiment, the link (154) provides a direct connection between the document and the revision history (152). The link may be embedded in the footer of the document, or in one embodiment, the link (154) may be embedded in an alternate location within the document, such as a signature block. Accordingly, the link functions as a connection from within the document to the revision history (152).

The director (142) is provided in communication with the tracker (140), and functions to manage or otherwise approve activation of the link (154) embedded in the document. In one embodiment, the director (142) enables or otherwise activates the link (154) based on a location or origin of the activation request. For example, in one embodiment, the activation of the link may only be available behind a firewall. In this case, the director (142) may enable or otherwise activate the link (154) when the document is open behind the firewall, and disable or otherwise deactivate the link (154) when the document is open from outside of the firewall. Similarly, in one embodiment, the director (142) may base activation of the link, also referred to herein as an activation request, from an origin of the request or selection of the link. The link (154) functions as a connection between the document and the revision history (152). Once activation of the link (154) is approved, the director (142) returns the revision history (152). Accordingly, through use of the firewall or an alternate location verification tool, the director (142) manages access to the revision history (152). As described above, the director (142) functions as an arbiter with respect to access to the revision history (152). More specifically, the director functions to approve the activation when the request location is behind the firewall, and to reject the activation when the request location is from outside of an associated firewall.

As identified above, the tracker (140) and the director (142) are shown residing local to the server (120). In one embodiment, the tracker (140) and director (142) may reside as one or more applications in memory (124) or as one or more hardware tools external to the memory (124). In another embodiment, the tracker (140) and the director (142) may be implemented as a combination of hardware and software. In the case of an embodiment with a pool of shared resources, such as a cloud computing environment, the tracker (140) and the director (142) may be collectively or individually distributed across the shared pool of computer resources and function as a unit to support tracking and managing document revisions. Accordingly, the tracker (140) and the director (142) may be implemented as one or more software tools, hardware tools, or a combination of software and hardware.

Figure 2:
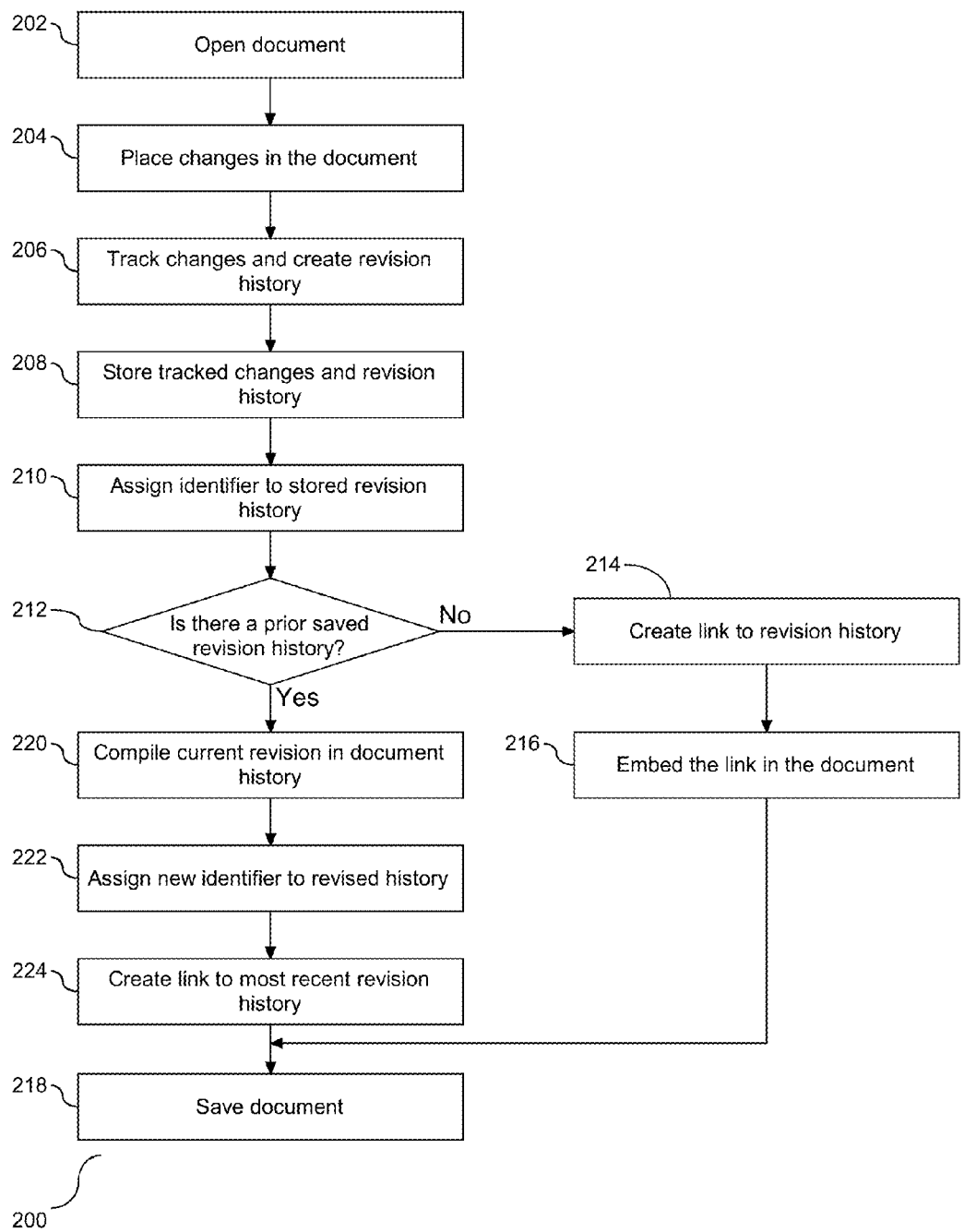
FIG. 2 depicts a flow chart illustrating one aspect of the functionality of a tracker.

To further illustrate and as shown herein, FIG. 2 is a flow chart (200) illustrating one aspect of the functionality of the tracker. As explained above, the tracker pertains to a soft document product which may be subject to changes as the product evolves. The process of tracking changes originates with opening a new document (202), as the tracker manages changes to an existing document. As changes to the document are placed in the document (204), the changes are tracked to create or otherwise maintain a revision history (206). That is, the changes placed in the document at step (204) are tracked in real-time to create or otherwise maintain the revision history at step (206). For an existing document without prior revisions, the revision history at step (206) is created. Similarly, for an existing document with prior revisions, the revision history is maintained, although with modifications from a prior version of the revision history. The revision history and the associated changes that are tracked are stored (208) in a data storage device. In addition, an identifier is assigned to the stored revision history (210). In one embodiment, the identifier is associated with a version of the stored document and the associated revisions. As the document evolves and different revisions are made, each formative of the saved and stored document is assigned a unique identifier. Accordingly, revisions to the document are managed through assignment of a unique identifier to a unique version of the document.

It is understood that multiple version identifiers may be retained, with each identifier associated with a different version of the document, and each version having a different or differing set of document changes. In one embodiment, a subsequent version identifier may replace a prior version identifier. The replacement would include a history of document changes that were associated with the prior version identifier. As shown and described in FIG. 2 and following step (210), it is determined if there is a prior saved revision history (212). If it is determined that the current version identifier is the first and only set of document revisions, a link associated with the revision history is created (214). To enable access to the revisions from the underlying document, the link is embedded in the shared document (216), and the document is saved (218).

If the response to the determination at step (212) indicates that there is a prior stored revision history, a compilation of the current revision(s) is made in a document revision history (220). Each new revision includes the date the revision took place and the actual change(s). A new identifier is assigned to the revised document history (222). To enable assess to the most recent revisions and the prior revisions from the underlying document, a link to the most recent document revision history is created (224), following by a return to step (218). In one embodiment, the new revision is appended to the prior revision document history and a new identifier is assigned to the revision history that includes all the new revisions. Accordingly, by annotating each revision with the date, the revision history provides a chronological view of the document changes.

Figure 3:
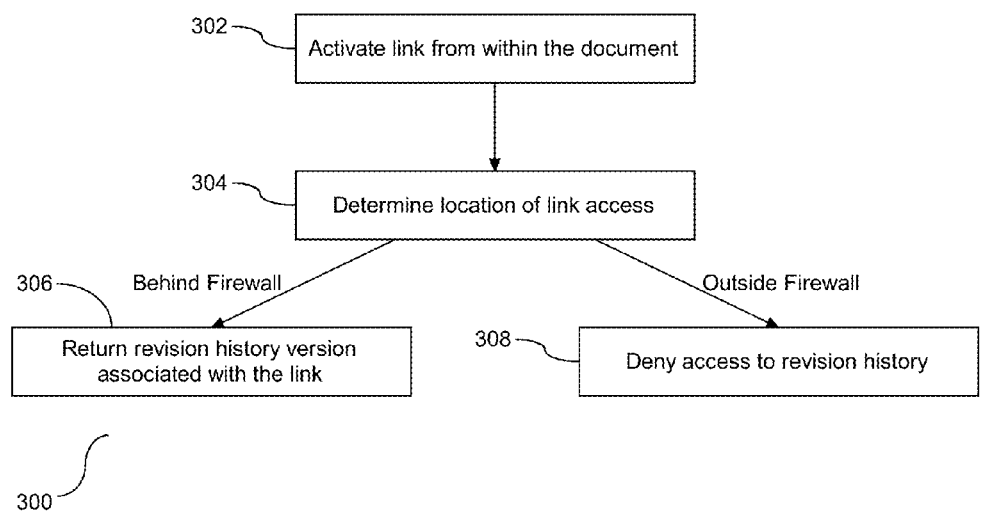
FIG. 3 depicts a flow chart illustrating an exemplary process for management of access to a revision history.

Management of access to the revision history maintains the confidentiality of the associated document revisions. Security protocols are employed to ensure that limited parties have access to the revisions. FIG. 3 is a flow chart (300) illustrating a process for management of access to the revision history. As explained in FIGS. 1 and 2, a link is created to the revision history, and this link is embedded in the revised document. Any party accessing the document may try to access the revision history through the link. In one embodiment, a security access protocol is placed such that any party that has access to the document from behind a firewall may have privileges to the revision history. At such time as the link within the document is activated (302), the location from where the link was access is determined (304). If the link access was from behind the firewall, a version of the revision history associated with the activated link and the identifier is returned (306). Similarly, if the link access was from outside of the firewall, then the request to enable or otherwise view the revision history is denied (308). In one embodiment, access to the revision history may employ an alternative security measurement, and should not be limited to that disclosed here. However, regardless of the security implementation, the link access and associated identifier are employed as security protocols. Accordingly, access to the revision history is limited in order to maintain confidentiality associated with the revisions.

The server described above in FIG. 1 has been labeled with tools in the form of a tracker and a director. The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 4:
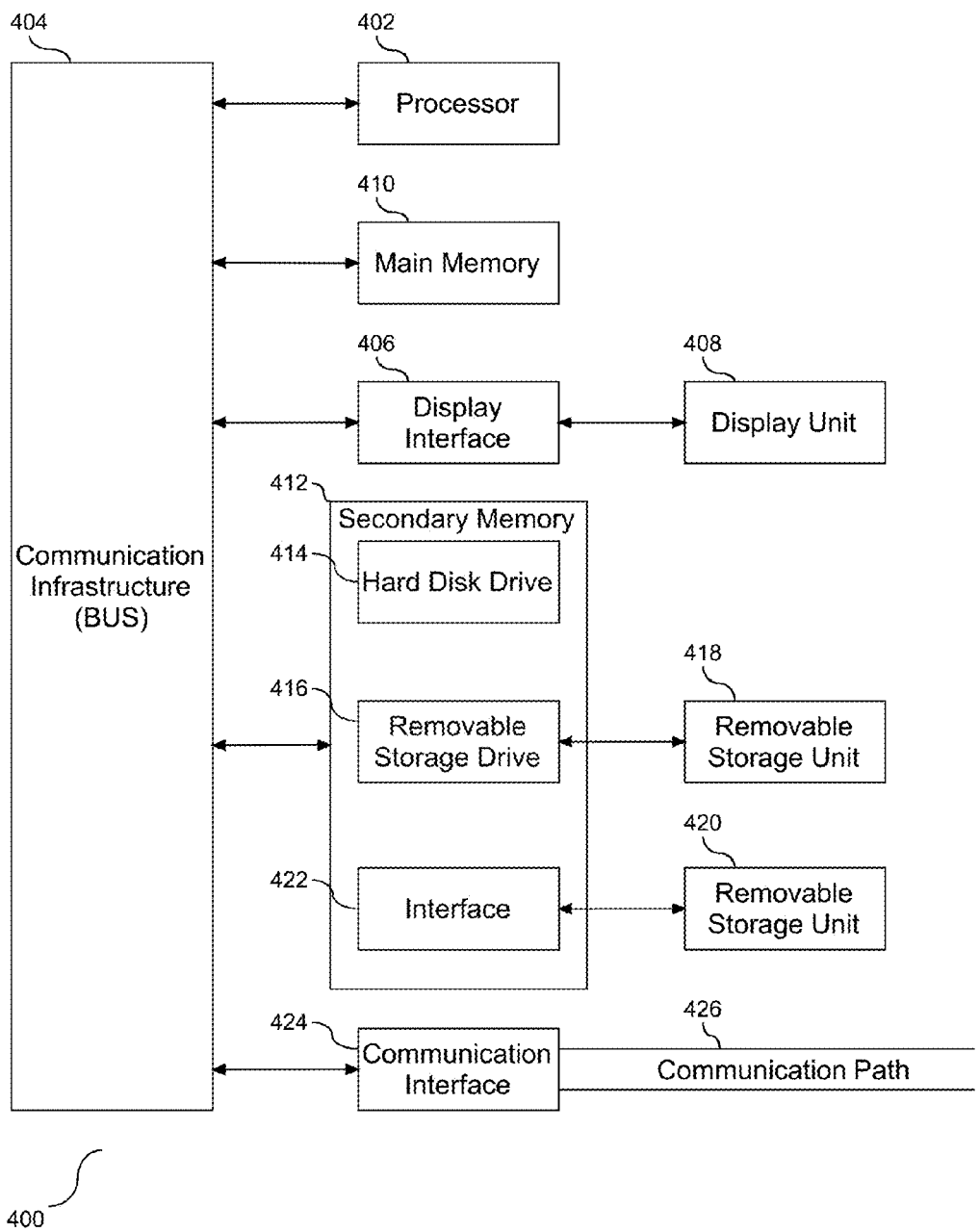
FIG. 4 depicts a block diagram of a computing environment, according to an embodiment.

Referring now to the block diagram of FIG. 4, additional details are now described with respect to implementing an embodiment of the present invention. The computer system includes one or more processors, such as a processor (402). The processor (402) is connected to a communication infrastructure (404) (e.g., a communications bus, cross-over bar, or network).

The computer system can include a display interface (406) that forwards graphics, text, and other data from the communication infrastructure (404) (or from a frame buffer not shown) for display on a display unit (408). The computer system also includes a main memory (410), preferably random access memory (RAM), and may also include a secondary memory (412). The secondary memory (412) may include, for example, a hard disk drive (414) and/or a removable storage drive (416), representing, for example, a floppy disk drive, a magnetic tape drive, or an optical disk drive. The removable storage drive (416) reads from and/or writes to a removable storage unit (418) in a manner well known to those having ordinary skill in the art. Removable storage unit (418) represents, for example, a floppy disk, a compact disc, a magnetic tape, or an optical disk, etc., which is read by and written to by removable storage drive (416). As will be appreciated, the removable storage unit (418) includes a computer readable medium having stored therein computer software and/or data.

In alternative embodiments, the secondary memory (412) may include other similar means for allowing computer programs or other instructions to be loaded into the computer system. Such means may include, for example, a removable storage unit (420) and an interface (422). Examples of such means may include a program package and package interface (such as that found in video game devices), a removable memory chip (such as an EPROM, or PROM) and associated socket, and other removable storage units (420) and interfaces (422) which allow software and data to be transferred from the removable storage unit (420) to the computer system.

The computer system may also include a communications interface (424). Communications interface (424) allows software and data to be transferred between the computer system and external devices. Examples of communications interface (424) may include a modem, a network interface (such as an Ethernet card), a communications port, or a PCMCIA slot and card, etc. Software and data transferred via communications interface (424) is in the form of signals which may be, for example, electronic, electromagnetic, optical, or other signals capable of being received by communications interface (424). These signals are provided to communications interface (424) via a communications path (i.e., channel) (426). This communications path (426) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (410) and secondary memory (412), removable storage drive (416), and a hard disk installed in hard disk drive (414).

Computer programs (also called computer control logic) are stored in main memory (410) and/or secondary memory (412). Computer programs may also be received via a communication interface (424). Such computer programs, when run, enable the computer system to perform the features of the present invention as discussed herein. In particular, the computer programs, when run, enable the processor (402) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the code stream compression supports flexibility with respect to decompression, including, decompression of the code stream from an arbitrary position therein, with the decompression being a recursive process to the underlying literal of a referenced phrase.

Alternative Embodiment

It will be appreciated that, although specific embodiments of the invention have been described herein for purposes of illustration, various modifications may be made without departing from the spirit and scope of the invention. In particular, an alternative security tool may be employed to hide revisions from within the document, including password protection or a document encryption. The alternative security tool may be employed in addition to or separate from the firewall determination. In the case of the additional security, access would be limited to a person or people who have been provided a security pass to the revision history that is within a geographical boundary. Similarly, in one embodiment, the access may be limited to a person or people with access to or knowledge of the security pass. Accordingly, the scope of protection of this invention is limited only by the following claims and their equivalents.

We claim:

1. A computer-implemented method comprising:
tracking changes to a document in real-time, including creating a revision history documenting the tracked changes as the changes are placed in the document;
storing the created revision history in an object library, wherein the revision history is stored separate from the document;
creating a hyperlink to the stored revision history, and embedding the created hyperlink in the document;
managing activation of the embedded hyperlink, wherein the activation of the embedded hyperlink is managed by a security protocol in response to determining an address of an activation request; and
returning the revision history in response to approval of the activation.

2. The method of claim 1, wherein managing the activation of the embedded hyperlink comprises approving the activation in response to the address of the activation request being within the firewall.

3. The method of claim 2, wherein managing the activation of the embedded hyperlink further comprises rejecting the activation in response to the address of the activation request outside of the firewall.

4. The method of claim 1, wherein the hyperlink is embedded in a select location within the document.

5. The method of claim 1, wherein the returned revision history is a most recent version of the revision history.

6. The method of claim 5, further comprising returning an identifier associated with the returned revision history.

7. The method of claim 1, wherein the creation of the revision history is automatic in response to the document changes, and further comprising automatically replacing a prior revision history with a new revision history in response to any additional document changes.

8. A computer program product for managing document revisions, the computer program product comprising a computer readable storage device having program code embodied therewith, the program code executable by a processor to:
track changes to a document in real-time, including creating a revision history documenting the tracked changes as the changes are placed in the document;
store the created revision history and the document in an object library, wherein the revision history is stored separate from the document;
create a hyperlink to the stored revision history, and embedding the created hyperlink in the document;
manage activation of the embedded hyperlink, wherein the activation of the embedded hyperlink link is managed by a security protocol in response to determining an address an activation request; and
return the revision history in response to approval of the activation.

9. The computer program product of claim 8, wherein managing the activation of the embedded hyperlink comprises program code to approve the activation in response to the address of the activation request being within the firewall.

10. The computer program product of claim 9, wherein managing the activation of the embedded hyperlink further comprises program code to reject the activation in response to the address of the activation request outside of the firewall.

11. The computer program product of claim 8, wherein the hyperlink is embedded in a selection location within the document.

12. The computer program product of claim 8, wherein the returned revision history is a most recent version of the revision history.

13. The computer program product of claim 12, further comprising program code to return an identifier associated with the returned revision history.

14. The computer program product of claim 8, wherein the creation of the revision history is automatic in response to the document changes, and further comprising program code to automatically replace a prior revision history with a new revision history in response to any additional document changes.

15. A computer system comprising:
a processing unit operatively coupled to memory;
one or more tools in communication with the processing unit to manage document revisions, the tools to:

track changes to a document in real-time, including creating a revision history documenting the tracked changes as the changes are placed in the document;
store the created revision history and the document, wherein the revision history is stored separate from the document;
create a hyperlink to the stored revision history, and embed the created hyperlink in the document;
manage activation of the embedded hyperlink, wherein the activation of the embedded hyperlink is managed by a security protocol in response to the detector determining an address an activation request; and
return the revision history in response to approval of the activation.

16. The system of claim 15, wherein managing the activation of the embedded hyperlink further comprises the tools to approve the activation in response to the address of the activation request being within the firewall, and to reject the activation in response to the address of the activation request being from outside of the firewall.

* * * * *